United States Patent
Barrett

[19]

[11] Patent Number: 5,897,080
[45] Date of Patent: Apr. 27, 1999

[54] EXTERNALLY MOUNTABLE SPACECRAFT EQUIPMENT MODULE

[75] Inventor: Alfred Barrett, Santa Monica, Calif.

[73] Assignee: TRW Inc., Redondo Beach, Calif.

[21] Appl. No.: 08/771,086

[22] Filed: Dec. 20, 1996

[51] Int. Cl.[6] .................................................. B64G 1/66
[52] U.S. Cl. ................................ 244/158 A; 244/158 R; 248/638
[58] Field of Search .......................... 244/158 R, 158 A, 244/131; 248/638

[56] References Cited

U.S. PATENT DOCUMENTS

| | | |
|---|---|---|
| 4,550,319 | 10/1985 | Ganssle et al. . |
| 5,027,892 | 7/1991 | Bannon et al. ................ 244/158 R X |
| 5,271,582 | 12/1993 | Perkins et al. . |
| 5,314,146 | 5/1994 | Chicoine et al. .................... 244/158 R |
| 5,332,188 | 7/1994 | Davis et al. ......................... 248/638 X |
| 5,369,952 | 12/1994 | Walters .............................. 248/638 X |
| 5,372,183 | 12/1994 | Strickberger . |
| 5,474,262 | 12/1995 | Fiore ................................... 244/158 A |
| 5,566,919 | 10/1996 | Shephard ............................ 248/638 X |

FOREIGN PATENT DOCUMENTS 2018211  10/1979  United Kingdom .

*Primary Examiner*—William Grant
*Attorney, Agent, or Firm*—Michael S. Yatsko

[57] ABSTRACT

A spacecraft electronics equipment module that is structurally and thermally independent of a core spacecraft structure to which it can be mounted. The module takes the form of a thermal radiation panel on which electronic components are directly mounted. The panel is attachable to the core structure using a statically determinate mount that renders the module structurally and thermally independent of the core structure. A combination of mounting brackets and struts secures the module from translational movement in all three axes, but permits thermal expansion and contraction in the plane of the panel without transferring any thermally induced forces to the core structure. A radiation shield secured over the electronics components also serves to further stiffen the panel and to enhance thermal conduction into the panel, which can radiate heat from both faces. Heat pipes can be attached to the panel to further enhance distribution of heat across the panel.

7 Claims, 1 Drawing Sheet

EXTERNALLY MOUNTABLE SPACECRAFT EQUIPMENT MODULE

BACKGROUND OF THE INVENTION

This invention relates generally to modular spacecraft configurations and, more particularly, to modular spacecraft electronic equipment panels that can be externally mounted on a core spacecraft structure. Conventional spacecraft designs have placed electronic equipment units on panels located inside box-like equipment compartments, with the panels typically forming the walls of the compartments. The equipment compartments are an integral part of the spacecraft structure. Complex interconnecting wiring connects the different electronic units together. Heat dissipated from the electronics equipment is conducted into the compartment panels and radiates into space. The size of each compartment is determined in part by the heat radiating area needed to cool the equipment, so there is often unused volume within each compartment. Because only one side of the equipment panel is used as a radiator, the equipment compartments often have to be very large to maintain desired operating temperatures. A related problem is that accessing equipment requires the removal of panels from the equipment compartment. Not only are compartments of this type bulky to accommodate in a launch vehicle and difficult to access for servicing, but they typically need to be coupled to other thermal radiator panels, through heat-conducting pipes, to provide overall thermal management of the spacecraft.

Further, because the equipment compartments are integral with the core structure of the spacecraft, thermally induced stresses are a significant problem because of temperature differences between the modules and the spacecraft core structure. In brief, these conventional equipment compartments are structurally and thermally dependent on the spacecraft core structure, and the overall design of the spacecraft must take into account the thermal requirements of each module and the structural forces resulting from the presence of each module.

As a result of these difficulties, the spacecraft core structure is usually constructed to have a relatively high weight and volume, to support the modules and to provide an adequate thermal radiation area. Also, it is usually the case that the choice of materials of both the modules and the spacecraft core structure is limited because there is a concern for differential thermal expansion. A further difficulty is that removal or addition of an electronics equipment unit upsets the overall structural and thermal design to some degree. Alignment problems, thermal management problems, or both, can result from simply removing or adding a unit.

All of the foregoing problems are attributable to interdependence of the equipment compartment(s) and the spacecraft core structure, which together interact, both structurally and thermally, as parts of a larger assembly. It will be appreciated, therefore, that there is a need for a different approach to the construction of spacecraft modules for supporting electronic equipment, to overcome the difficulties noted above. The present invention satisfies this requirement and has additional advantages that will become apparent from the following summary.

SUMMARY OF THE INVENTION

The present invention resides in a spacecraft equipment module that is structurally and thermally isolated from a spacecraft core structure to which the module is attached. Briefly, and in general terms, the module of the invention comprises a base panel that also serves as a thermal radiator; electronic components mounted on the base panel; an interface connector, to connect the module to other modules through a common interface; and statically determinate mounting means, for attaching the module to a spacecraft core structure to permit expansion or contraction of the module without transmitting forces to the core structure. The resulting module is structurally and thermally independent of the spacecraft core structure.

More specifically, the statically determinate mounting means includes a combination of mounting brackets and other structural members that precludes movement of the base panel in a direction perpendicular to its faces, but permits expansion or contraction movement in first and second orthogonal directions in the plane of the base panel. The combination of brackets and other structural members includes a mounting element of a first type, attached to the base panel at a first mounting point to prevent movement of the first mounting point on the base panel in the first direction but not in the second direction; and a mounting element of a second type, attached to the base panel at a second mounting point to prevent movement of the second mounting point in the second direction but not in the first direction. A thermally induced change in dimensions of the base panel in the first and second directions is accommodated by the mounting elements of the first and second types, without transferring any thermally induced forces through the mounting elements.

At least one of the mounting elements of the first and second types is also capable of transmitting force in a third direction, perpendicular to the base panel, to prevent movement of the base panel in the third direction. Preferably, the combination of brackets and structural members further includes at least one mounting element of a third type, attached to the base panel at a third point to support the base panel in the third direction by transmitting force only in that direction and not in the first and second directions. Mounting elements of the third type further help support the module base panel to prevent unwanted movement perpendicular to the panel.

More specifically, the combination of mounting brackets and other structural members includes at least one pair of structural members, a first mounting bracket and at least one additional mounting bracket. These structural members extend from a mounting point on the base panel to mounting points on the core structure. They prevent movement of the mounting point on the base panel in a direction perpendicular to the plane of the base panel and also prevent movement in the first direction but not in the second. The first mounting bracket is located between the base panel and the core structure, to prevent movement in the second direction but not in the first; and at least one additional mounting bracket includes a structural feature that permits movement of the base panel in the first and the second directions, but not in a direction perpendicular to its face.

In summary, the combination of mounting brackets and other structural members prevents translational movement of the entire base panel in all three axes. In each of the two axes coplanar with the panel, however, the panel is secured at only one mounting point or edge, allowing movement at other points along each of the two axes, such that expansion or contraction can occur without transferring thermally induced forces through the mounting brackets and other structural members.

The equipment module of the invention may also include a radiation shield covering the electronic components and further stiffening the base panel, and at least one heat conducting pipe secured to the base panel for enhanced heat distribution in the panel.

It will be appreciated from the foregoing that the present invention represents a significant advance in the field of modular spacecraft construction. In particular, the invention provides a module that is structurally and thermally independent of the core structure to which it is mounted. Other aspects and advantages of the invention will become apparent from the following more detailed description, taken in conjunction with the accompanying drawings.

DESCRIPTION OF THE PREFERRED EMBODIMENT

Figure 1:
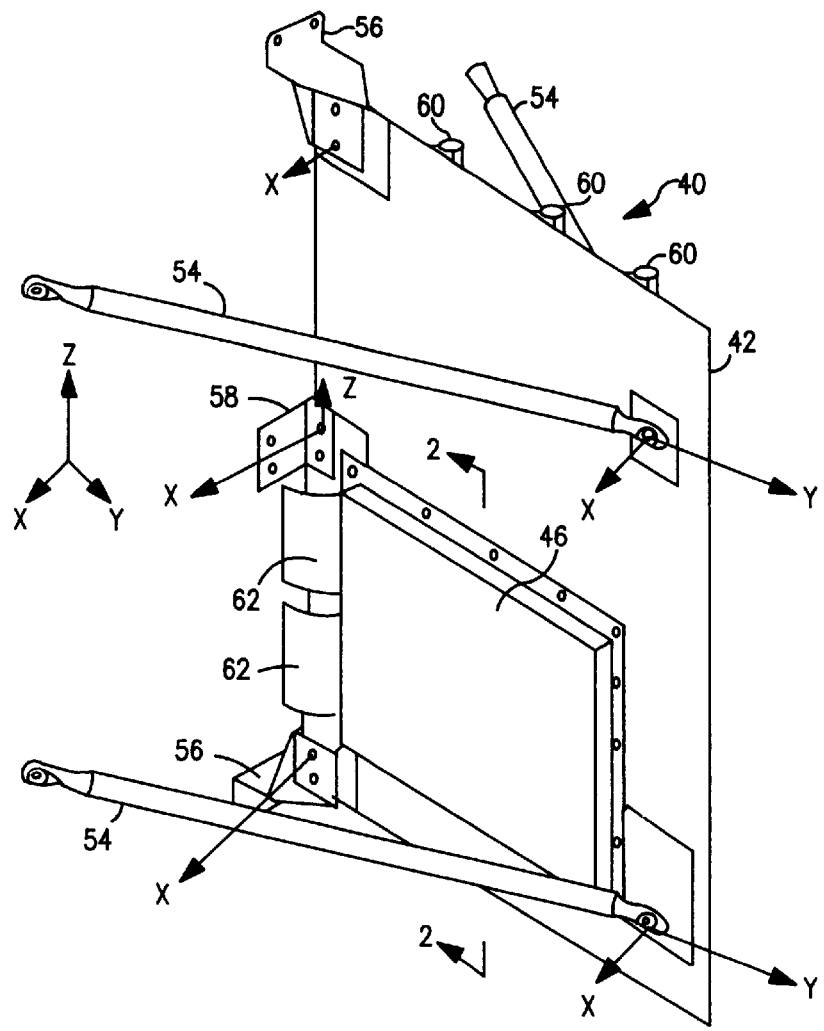
FIG. 1 is an isometric view of a spacecraft module and mounting structure in accordance with a preferred embodiment of the present invention.

As shown in the drawings for purposes of illustration, the present invention pertains to a spacecraft electronics equipment module. In the past, spacecraft modules have been housed in boxes rigidly mounted on a spacecraft core structure, and have been thermally and structurally dependent on the core structure. This dependence has led to a variety of problems, such as overly bulky construction, induced thermal stresses, and the need for heat pipes to conduct thermal energy away from the modules. Box-like modules also use launch vehicle volume very inefficiently.

In accordance with the invention, a spacecraft equipment module is constructed to be thermally and structurally independent of the spacecraft core structure to which it is attached.

In the context of the invention, the term "structurally independent" does not mean that the module is a freestanding structure, but that it is attached to the core structure through a statically determinate mounting, which is designed not to transmit thermally induced forces between the module and the core structure.

Figure 2:
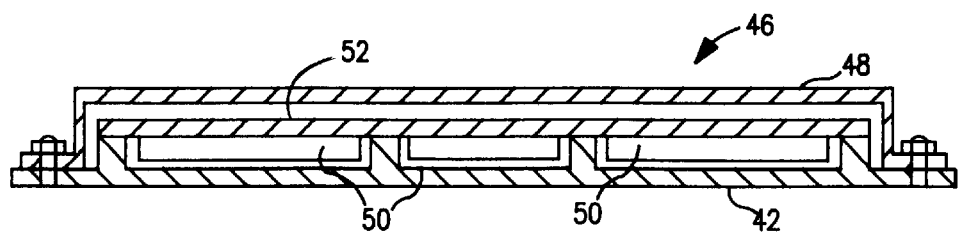
FIG. 2 is a cross-sectional view taken generally along the line 2—2 of FIG. 1 and depicting an electronics payload component housed on the spacecraft module.

By way of more specific example, FIG. 1 depicts the structural details of a spacecraft module 40 in accordance with the present invention. The module 40 in this example is structured on a flat, generally rectangular radiator panel 42, which, as will be seen in subsequent figures, attaches to a spacecraft core structure (not shown). The core structure can be very simple and light in weight because each module 40 is structurally self-sufficient from its points of attachment to the core structure 44. The module 40 includes an electronics element 46 mounted on the panel 42 and protected by a radiation cover 48. The electronics element 46, as shown in FIG. 2, includes electronic and RF elements 50 mounted on a circuit board 52 installed under the cover 48. The module 40 has a set of four struts 54, three of which are visible in the drawings, two end supporting brackets 56 and a central supporting bracket 58 for attachment to the core structure. The radiation panel 42 is nominally two-sided, for thermal radiation in two directions, but can be used as a single-sided radiator, as when mounted parallel to the supporting or core structure. Heat pipes, portions of which are shown at 60, can be used to increase the thermal efficiency and capacity of the radiator 42 by conducting heat over substantially the entire radiating surface.

Interfaces, shown diagrammatically at 62, are provided for connection to a "backbone" structure (not shown in FIG. 1), through which multiple modules are interconnected and attached to the core spacecraft structure. This disciplined interconnection interface replaces wiring harnesses presently used to interconnect modules. Although various configurations are contemplated, by way of example the interfaces 62 can provide payload, RF and power connections to the module 40, through connectors that are effectively shielded against electromagnetic interference (EMI). Each module 40 is designed to be structurally self-sufficient, to have integral thermal control and switching capability, and stand-alone power management capability. Data interface to the module 40 is made through a commercially available data bus (not shown).

For a particular system design, modules 40 can be added or deleted without impacting the complexity of the design at a system level. The only significant limiting factor is the maximum capacity of the core structure and any associated solar arrays. In effect, the modular design of the system tends to move complexity inside the individual module boundaries and dramatically reduce system level complexity and design requirements.

The statically determinate nature of the mounting system, comprising the struts 54 and the mounting brackets 56 and 58, limits the transmission of force between the module 40 and core structure. For discussion purposes, three axes, X, Y and Z are defined as follows. The X-axis direction is perpendicular to the surface of the panel 42, as indicated in the figure. The Y-axis and Z-axis directions are in the plane of the panel 42, with the Z-axis direction being parallel to the edge of the panel on which the brackets 56 and 58 are mounted. FIG. 1 shows the direction of forces (X, Y and Z) transferred by the struts 54 and mounting brackets 56 and 58.

For clarity in the drawing, only a single force vector is indicated for each axis at each mounting point. It will be understood, of course, that the components of force along each axis may be in either direction (e.g., +X or −X) and that a force in one direction acting on the base panel 42 at a particular mounting point will be balanced by an equal and opposite force acting on the mounting bracket or strut at the same mounting point. For purposes of the following discussion, however, only the axis in which the force acts is significant, not the direction or polarity of the force along the axis.

The central bracket 58 transmits forces in the X and Z directions only. It can take the form of a right-angle bracket attached rigidly to the core structure and attached to the panel 42 to permit limited motion in the Y direction. This Y-direction motion can be accommodated by building the bracket 58 to include a flexure, or by providing slotted mounting holes in the portion of the bracket that attaches to the plate 42. This bracket 58 provides the only support for the panel in the Z direction. The other two brackets 56 at the top and bottom ends of the panel 42 provide for transmission of force only in the X direction, i.e., perpendicular to the panel. Each of these brackets consists of three-dimensionally bent plate, having a first planar section in the plane of the panel 42, for rigid attachment to the panel, a second planar section in the plane of the core structure, which is the X-Z plane, and a number of transition sections, which act as flexures, between the first and second planar sections. Limited movement of the panel 42 in the Z direction or the Y direction is not transmitted through the bracket 56, but results in bending of the bracket in its intermediate flexure sections, since these sections are designed to be easily bendable by forces in either of these directions. Movement of the panel 42 in the Z direction, for example, which would occur if the panel were to expand or contract in this direction as a result of thermal expansion or contraction, would simply result in bending of the brackets 56. Any force in the X direction, however, is transmitted through the brackets 56.

The struts 54 transmit forces only along their longitudinal axes. Because the struts are all aligned in X-Y planes, perpendicular to the plane of the base panel 42, these axial forces may be decomposed into forces in the X and Y directions. The forces in the X direction prevent movement of the panel 42 perpendicular to its faces. The forces in the Y direction prevent translational movement of the panel 42 in this direction. However, because the mounting brackets 56 and 58 do not transfer forces in the Y direction, the panel 42 can expand or contract in this direction.

In summary, the panel 42 is mounted in a statically determinate manner. Specifically, the panel 42 is secured in the Z direction only by the middle bracket 58, Therefore, differential expansion or contraction can occur in the Z direction without transmitting stress from or into the panel 42. Further, the panel 42 is secured in the Y direction only by the struts 54, so differential expansion or contraction can occur in this direction without transmitting stress from or into the panel. Finally, the panel 42 is supported in the X direction, perpendicular to its surface, by all five supporting elements, including the struts 54 and the brackets 56 and 58. Therefore, the panel 42 is secured in all three axis directions, but is permitted limited expansive or contractive movement in the plane of the panel itself.

Because the mounting structure minimizes the transfer of stress to the spacecraft as a result of differential thermal expansion, the material of the panel 42 can be selected without having to match it thermally with the material of the core structure of the spacecraft. The material of the panel 42 is, therefore, best chosen for its properties as a radiator and, may, for example, be a machined sheet of aluminum or some other suitable heat conductor. The aluminum material may be conveniently machined to include thickened portions and "standoffs" for attachment of the electronic components. The material of the core structure of the spacecraft may also be selected without regard to the module material, and a suitable lightweight structural material can be used. Selection of materials with different coefficients of thermal expansion, for the equipment panel and the core structure, would have caused significant structural problems prior to this invention.

Another important advantage of the module of the invention is that it can radiate heat from two sides, thereby minimizing the overall size and weight requirements for the panel. Each module panel 42 can be selected in size to meet the heat dissipation needs of the electronics unit 46, without carrying unnecessary weight on the spacecraft. The heat pipes 60 can be conveniently soldered to the panel 42 to maximize thermal conductivity.

The radiation cover 48, which is bolted rigidly to the panel 42, adds structural stiffness to the module, and therefore minimizes bending, especially when larger panels are used. The radiation cover 48 also enhances conduction of heat from the electronics elements 50 to the rest of the panel 42.

It will be appreciated from the foregoing that the present invention represents a significant advance in the field of spacecraft module design. In particular, the invention provides an externally mountable equipment module that is structurally and thermally independent of the structure to which it is mounted. Thermal independence is achieved by virtue of the two-sided radiator panel on which the electronic equipment is mounted, while structural independence is achieved with use of a structurally determinate mounting that permits limited expansion and contraction in the plane of the module panel. It will also be appreciated that, although a specific embodiment of the invention has been disclosed for purposes of illustration, various modifications may be made without departing from the spirit and scope of the invention. Accordingly, the invention should not be limited except as by the appended claims.

What is claimed is:

1. An externally mountable spacecraft equipment module and mounting structure, comprising:

a base panel that also serves as a thermal radiator;

electronic components mounted on the base panel;

an interface connector, to connect the module to other modules through a common interface; and statically determinate mounting means, for attaching the module to a spacecraft core structure to permit expansion or contraction of the module without transmitting forces to the core structure;

wherein the module is structurally and thermally independent of the spacecraft core structure, and wherein the statically determinate mounting means includes a combination of mounting elements that prevents movement of the base panel in a direction perpendicular to its faces, but permits expansion or contraction movement in first and second orthogonal directions in the plane of the base panel.

2. An externally mountable spacecraft equipment module and mounting structure as defined in claim 1, wherein the combination of mounting elements includes:

a mounting element of a first type, attached to the base panel at a first mounting point to prevent movement of the first mounting point on the base panel in the first direction but not in the second direction; and a mounting element of a second type, attached to the base panel at a second mounting point to prevent movement of the second mounting point in the second direction but not in the first direction;

wherein a thermally induced change in dimensions of the base panel in the first and second directions is accommodated by mounting elements of the first and second types without transferring any thermally induced forces through the mounting elements.

3. An externally mountable spacecraft equipment module and mounting structure as defined in claim 2, wherein:

at least one of the mounting elements of the first and second types is also capable of transmitting force in a third direction, perpendicular to the base panel, to prevent movement of the base panel in the third direction.

4. An externally mountable spacecraft equipment module and mounting structure as defined in claim 3, wherein the combination of mounting elements further includes:

at least one mounting element of a third type, attached to the base panel at a third point to support the base panel in the third direction by transmitting force only in that direction and not in the first and second directions.

5. An externally mountable spacecraft equipment module and mounting structure as defined in claim 1, wherein the combination of mounting elements includes:

at least one set of structural members extending from a mounting point on the base panel to mounting points on the core structure, wherein these structural members prevent movement of the mounting point on the base panel in a direction perpendicular to the plane of the base panel and also prevent movement in the first direction but not in the second;

a first mounting bracket between the base panel and the core structure, to prevent movement in the second direction but not in the first; and at least one additional mounting bracket between the base panel and the core structure, the additional mounting bracket including a structural element that permits movement of the base panel in the first and the second directions, but secures the panel from movement in a direction perpendicular to its face.

6. An externally mountable spacecraft equipment module and mounting structure as defined in claim 1, and further comprising:

a radiation shield covering the electronic components and further stiffening the base panel.

7. An externally mountable spacecraft equipment module and mounting structure as defined in claim 1, and further comprising:

at least one heat conducting pipe secured to the base panel for enhanced heat distribution in the panel.

* * * * *